(12) United States Patent
Foran-Owens et al.

(10) Patent No.: US 9,401,063 B2
(45) Date of Patent: Jul. 26, 2016

(54) ALL-IN-ONE PROXIMITY PAYMENT DEVICE WITH LOCAL AUTHENTICATION

(75) Inventors: Elizabeth M. Foran-Owens, Stamford, CT (US); John Wankmueller, Great Neck, NY (US); Cristian Radu, Beauvechain (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1039 days.

(21) Appl. No.: 12/303,773

(22) PCT Filed: Jun. 8, 2007

(86) PCT No.: PCT/US2007/070679
§ 371 (c)(1),
(2), (4) Date: Nov. 5, 2010

(87) PCT Pub. No.: WO2007/143740
PCT Pub. Date: Dec. 13, 2007

(65) Prior Publication Data
US 2011/0047036 A1    Feb. 24, 2011

Related U.S. Application Data

(60) Provisional application No. 60/811,982, filed on Jun. 8, 2006.

(51) Int. Cl.
*G06Q 20/06* (2012.01)
*G06Q 20/18* (2012.01)
*G07F 7/10* (2006.01)
*G06Q 20/32* (2012.01)
*G06Q 20/36* (2012.01)
*G06Q 20/34* (2012.01)

(Continued)

(52) U.S. Cl.
CPC .............. *G07F 7/1008* (2013.01); *G06Q 20/06* (2013.01); *G06Q 20/0658* (2013.01); *G06Q 20/18* (2013.01); *G06Q 20/204* (2013.01); *G06Q 20/3223* (2013.01); *G06Q 20/341* (2013.01); *G06Q 20/356* (2013.01); *G06Q 20/367* (2013.01); *G06Q 20/3823* (2013.01); *G06Q 20/38215* (2013.01); *G06Q 20/40145* (2013.01); *G07F 7/0886* (2013.01)

(58) Field of Classification Search
None
See application file for complete search history.

(56) References Cited

U.S. PATENT DOCUMENTS 4,582,985 A    4/1986  Lofberg
5,623,552 A    4/1997  Lane
(Continued)

FOREIGN PATENT DOCUMENTS

JP    11-025246    1/1999
JP    2000-250861    9/2000

OTHER PUBLICATIONS

See definition of "sending", Random House Dictionary (2012).*
(Continued)

*Primary Examiner* — Peter L. Ludwig
(74) *Attorney, Agent, or Firm* — Baker Botts L.L.P.

(57) ABSTRACT

A personal powered proximity payment device that can be owned by or issued to an individual user is provided. The device is a non-ISO card device that includes an internal dual-mode (contact and contactless) chip card coupled to a display and a robust PIN entry or biometric reading means. The device provides proximity payment functions, and optional proximity payment on/off and local pre-purchase account holder verification functions to the individual user.

7 Claims, 2 Drawing Sheets

(51) Int. Cl.
*G06Q 20/20* (2012.01)
*G06Q 20/38* (2012.01)
*G06Q 20/40* (2012.01)
*G07F 7/08* (2006.01)

(56) References Cited

U.S. PATENT DOCUMENTS

| | | | |
|---|---|---|---|
| 5,712,473 A | 1/1998 | Nagashino | |
| 5,748,737 A * | 5/1998 | Daggar | 705/41 |
| 5,801,367 A * | 9/1998 | Asplund et al. | 235/384 |
| 6,016,476 A | 1/2000 | Maes et al. | |
| 6,208,264 B1 | 3/2001 | Bradney et al. | |
| 6,213,403 B1 | 4/2001 | Bates, III | |
| 6,325,285 B1 | 12/2001 | Baratelli | |
| 6,360,953 B1 | 3/2002 | Lin et al. | |
| 6,494,380 B2 | 12/2002 | Jarosz | |
| 6,547,130 B1 | 4/2003 | Shen | |
| 6,592,031 B1 | 7/2003 | Klatt | |
| 6,624,739 B1 | 9/2003 | Stobbe | |
| 6,763,459 B1 * | 7/2004 | Corella | 713/156 |
| H2120 H * | 7/2005 | Cudlitz | 235/382 |
| 6,954,133 B2 * | 10/2005 | McGregor et al. | 340/5.26 |
| 6,976,011 B1 * | 12/2005 | Capitant et al. | 705/67 |
| 7,028,893 B2 * | 4/2006 | Goodman et al. | 235/380 |
| 7,044,368 B1 * | 5/2006 | Barron | 235/380 |
| 7,110,744 B2 * | 9/2006 | Freeny, Jr. | 455/406 |
| 7,155,416 B2 | 12/2006 | Shatford | |
| 7,392,226 B1 * | 6/2008 | Sasaki et al. | 705/64 |
| 7,431,217 B2 * | 10/2008 | Smets et al. | 235/492 |
| 7,472,829 B2 * | 1/2009 | Brown | 235/382.5 |
| 7,660,574 B2 * | 2/2010 | Niimi | 455/407 |
| 7,712,658 B2 * | 5/2010 | Gangi | 235/380 |
| 8,116,825 B1 * | 2/2012 | Cockayne | 455/566 |
| 2002/0016913 A1 * | 2/2002 | Wheeler et al. | 713/170 |
| 2003/0172028 A1 * | 9/2003 | Abell et al. | 705/40 |
| 2004/0029569 A1 * | 2/2004 | Khan et al. | 455/414.1 |
| 2004/0030601 A1 * | 2/2004 | Pond et al. | 705/16 |
| 2004/0124248 A1 * | 7/2004 | Selker | 235/492 |
| 2004/0210566 A1 * | 10/2004 | Smith et al. | 707/3 |
| 2005/0137977 A1 * | 6/2005 | Wankmueller | 705/40 |
| 2005/0187873 A1 * | 8/2005 | Labrou et al. | 705/40 |
| 2005/0222961 A1 * | 10/2005 | Staib et al. | 705/64 |
| 2005/0234778 A1 * | 10/2005 | Sperduti et al. | 705/22 |
| 2006/0022044 A1 * | 2/2006 | Smets et al. | 235/451 |
| 2006/0180660 A1 * | 8/2006 | Gray | 235/380 |
| 2006/0224470 A1 * | 10/2006 | Garcia Ruano et al. | 705/27 |
| 2007/0075133 A1 * | 4/2007 | Yeager | 235/380 |
| 2009/0144161 A1 * | 6/2009 | Fisher | 705/16 |

OTHER PUBLICATIONS

U.S. Appl. No. 10/950,796 (Abandoned), filed Sep. 27, 2004.
U.S. Appl. No. 10/950,796, Oct. 4, 2007 Notice of Abandonment.
U.S. Appl. No. 10/950,796, Feb. 12, 2007 Non-Final Office Action.

* cited by examiner

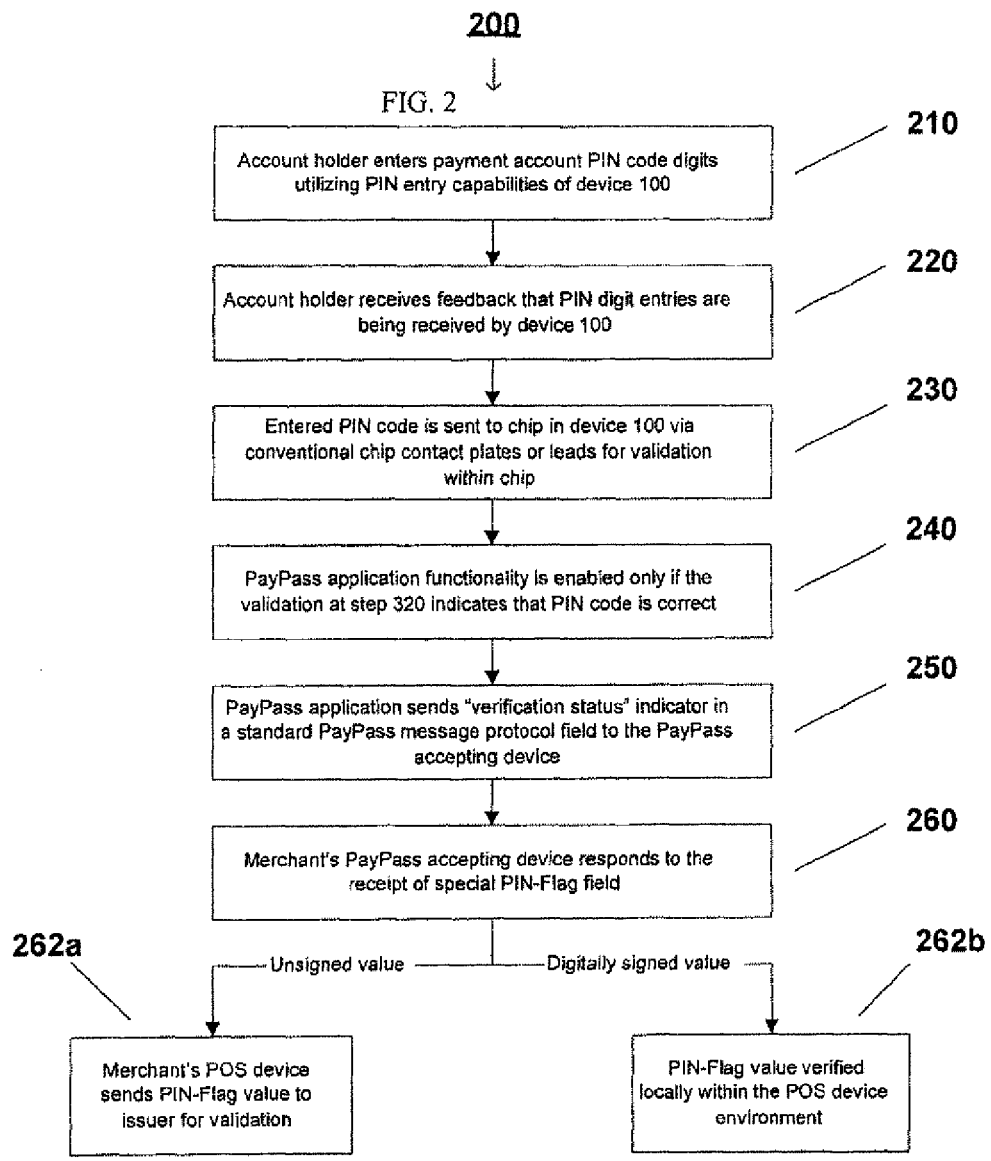

ALL-IN-ONE PROXIMITY PAYMENT DEVICE WITH LOCAL AUTHENTICATION

CROSS-REFERENCE TO RELATED APPLICATIONS

This application is a national phase of International Application PCT/US07/070679 filed Jun. 6, 2007 which claims priority to U.S. Provisional Application Ser. No. 60/811,982, filed Jun. 8, 2006, both of which are incorporated by reference herein in their entirety.

BACKGROUND OF THE INVENTION

Smart card technology is fast becoming commonplace in our culture and daily lives. A smart card is a card that is embedded with either a microprocessor and a memory chip or only a memory chip with non-programmable logic. The microprocessor card can add, delete, and otherwise manipulate information on the card, while a memory-chip card (for example, pre-paid phone cards) can only undertake a pre-defined operation. Smart cards, unlike magnetic stripe cards, can carry all necessary functions and information on the card. Therefore, they do not require access to remote databases at the time of the transaction.

Smart cards, which are also generally referred to by the industry as "microprocessor cards" or "chip cards", offer greater memory storage and security of data than traditional magnetic stripe cards. Smart cards may have up to 8 kilobytes of RAM, 346 kilobytes of ROM, 256 kilobytes of programmable ROM, and a 16-bit microprocessor. A smart card uses a serial interface and receives its power from external sources like a card reader. The processor uses a limited instruction set for applications such as cryptography. Smart cards are used for a variety of applications, especially those that have cryptography built in, which require manipulation of large numbers. Thus, smart cards have been the main platform for cards that hold a secure digital identity. The most common smart card applications are:

Credit cards
Electronic cash
Computer security systems
Wireless communication
Loyalty systems (like frequent flyer points)
Banking
Satellite TV
Government identification Delivering security—i.e., ensuring access is granted only for authorized usage by authorized cardholders—is the fundamental attribute of smart cards. The effectiveness of smart cards in delivering security is one of the reasons they have been so widely adopted, especially in financial services and mobile phones, why the growth of smart cards has been explosive, and why their usage is expected to expand rapidly for other applications such as personal identity cards, access to pay TV/entertainment, health care services and transportation. Assignee MasterCard makes smart card based authentication solutions (e.g., a program called the Chip Authentication Program (CAP)) available to card issuers. CAP can also be used for Internet banking and other applications requiring positive cardholder authorization. (See, e.g., Rutherford et al., International Patent Publication No. WO/2005/001618, Wankmueller et al., International Patent Publication No. WO/2003/081832, and, Harris et al., International Patent Publication No WO/2001/027887, all of which publications are incorporated by reference herein).

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless smart card payment technologies. Three such exemplary standards which have been defined by ISO/TEC are the ISO/IEC 10536, ISO/IEC 14443, and ISO/IEC 15693 standards applicable to Close Coupling, Proximity and Vicinity cards, respectively.

Recently, assignee MasterCard International Incorporated ("MasterCard") has developed proprietary specifications MasterCard PayPass™ ISO/TEC 14443 Implementation Specification ("PayPass") for implementation of proximity (contactless) payment card technologies. PayPass is an RF-enabled contactless payment platform, which lets users tap or wave a device in front of a special reader in order to process a transaction. The PayPass implementations are consistent with the ISO/IEC 14443 Standard and provide a convenient example illustrating the principles of the present invention. See, e.g., Smets et al., U.S. patent application Ser. Nos. 11/182,354, 11/182,357, 11/182,358, 11/182,356, 11/182,355, and 11/182,351, all filed Jul. 15, 2005 and all of which are incorporated by reference herein.

In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 cards, any additional proprietary card types and also existing "contact" payment cards. A method and system for conducting transactions using a payment card with two different technologies is described in Wankmueller U.S. Pat. No. 6,857,566, which is incorporated by reference herein in its entirety.

Consideration is now being given to enhancing electronic payment solutions and devices. Attention is being directed to non-standard electronic payment devices with a view to integrating the features of both contact and non-contact payment devices.

Further features of the invention, its nature and various advantages will be more apparent from the accompanying drawings and the following detailed description.

SUMMARY OF THE INVENTION

Proximity payment devices and methods with local authentication features for facilitating proximity payment transactions are provided.

An exemplary proximity payment device ("all-in-one" proximity payment device) includes an internal dual-mode (contact and contactless) chip card. The all-in-one device further includes an ISO 14443 antenna connected to the chip card for contactless operation. Further, the dual-mode chip card includes proximity payment applications (such as MasterCard's PayPass application) for contactless operation. The contact portions of the chip have integrated PIN entry and/or biometric reader capability (e.g., via chip contact plates). The chip is configured to provide local verification of the PIN or biometric signature submitted by a user. The dual-mode chip card includes contact chip applications (e.g., MasterCard's CAP user authentication application) for this purpose and other purposes.

The local verification feature of the all-in-one device advantageously eliminates the need to have the proximity device/account holder (e.g., a PayPass payment account holder) enter his or her PayPass payment account PIN or biometric signature into a separate merchant device for making a proximity payment transaction. The feature also advantageously dispenses with the need to have a separate PIN entry device at the merchant point of interaction. Instead, the PIN or biometric signature can be submitted or entered in the account holder's own device. The all-in-one device allows PayPass transactions of any dollar size to be transacted without requiring merchants to deploy any user transaction verification hardware (e.g., PIN Pads or biometric readers).

In a method for making a customer-merchant transaction using the all-in-one device, the merchant terminal (or POS device, ATM etc.) receives a transaction that has already been approved or signed by the consumer. Thus, the merchant POS device does not have to prompt the customer for PIN or a biometric signature entry. In one embodiment, the all-in-one device generates a chip produced Cardholder Verification Result (PIN-Flag), which is sent to the all-in-one device issuer and is of use only for the upcoming payment transaction.

In an embodiment of the invention, the all-in-one device is a battery-powered PayPass device having a display and PIN entry or biometric reading capability. The device is a "non-ISO card" device that uses an internal dual-mode (contact and contactless) chip card. The battery-powered PayPass device has the usual PayPass functions and may further have an optional PayPass on/off switching function and an optional PayPass pre-purchase account holder verification function. The beneficial features of this all-in-one device include: a) the use of the display, and b) PIN entry or biometric reader capability of the device for a number of optional controls of the PayPass payment application.

In the operation of this all-in-one device, a user can activate the PayPass on/off function (e.g., by manually depressing a "power on" switch or pushbutton) to enable proximity PayPass chip communications/functionality for a desired time period. Alternatively, the user can enter a code or biometric to enable proximity PayPass chip communications/functionality for a suitably specified time period upon successful local verification by the chip. The user enters their account PIN code or biometric (e.g., via device pushbuttons), which is communicated internally or locally to the device chip via chip physical contact plates or leads. The account code PIN code or biometric is locally checked by the chip. Upon successful verification, the proximity PayPass functionality of the device is enabled by the chip, which additionally produces a unique one-time use cryptogram PIN-Flag. The one-time use cryptogram PIN-Flag, which may, for example, be up to 8 bytes long or a fraction thereof, is converted to digit format using PayPass conversion methods for display. Thus, the all-in-one device, which may be personally owned by (or issued to) an individual user, allows the user to "pre-sign" a PayPass transaction.

BRIEF DESCRIPTION OF THE DRAWINGS

Further features and advantages of the disclosed subject matter will become apparent from the following detailed description taken in conjunction with the accompanying figures showing illustrative embodiments of the disclosed subject matter, in which:

FIG. 2 is a flow diagram illustrating exemplary steps in proximaty payment transaction using local authentication features of the device of FIG. 1, in accordance with the principles of the present invention.

DESCRIPTION OF THE INVENTION

Figure 1:
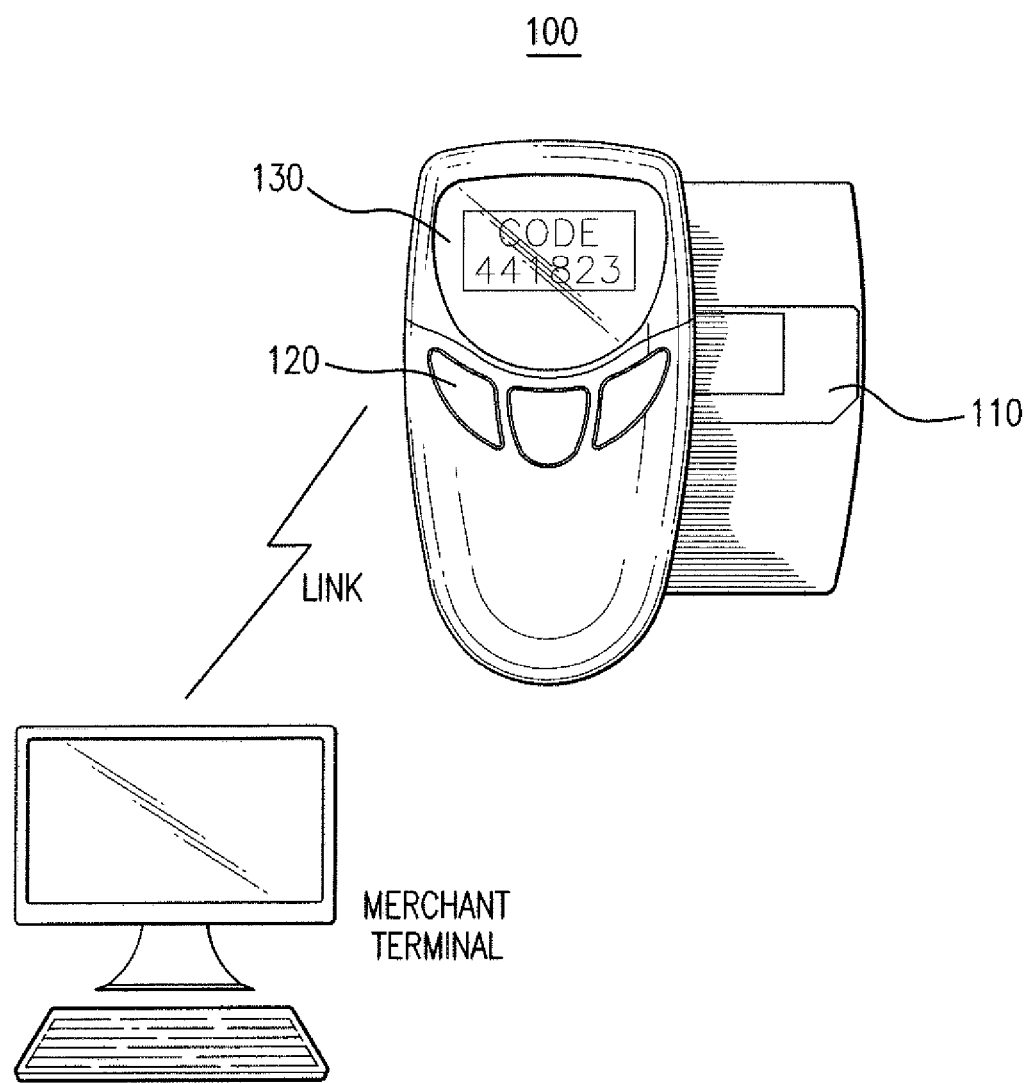
FIG. 1 is a schematic illustration of an all-in-one payment device based on a non-ISO contact payment device, which is configured to additionally have contactless payment capabilities, in accordance with the principles of the present invention. A chip card with an RF antenna provides non-contactless proximity payment capabilities.

An all-in-one payment device is provided. The all-in-one payment device has operational features of both a contact payment device and a non-contact (i.e., proximity) payment device. The all-in-one payment device need not conform to ISO specifications.

The invention is described herein using MasterCard's branded PayPass proximity devices and applications as illustrative examples, with the understanding that the present invention is not limited to the examples used herein, but is also applicable to other types of payment applications, instruments or devices that may be used in proximity payment transactions.

In an embodiment of the invention shown in FIG. 1, an exemplary non-ISO device (e.g., a portable contact payment card device or token 100, FIG. 1) further includes a microelectronic chip card 110. Portable contact payment card device or token 100 may, for example, be fabricated by modifying a commercially available non-ISO device (e.g., models Xi-Sign sold by Almex Ltd., 3853 Trelawny Circle, Mississauga, Ontario, Canada L5N 6S4). Chip card 110 includes an RF antenna (e.g., a PayPass antenna) and a proximity payment application (e.g., a PayPass application) disposed on it. Further, a suitable authentication program (e.g., MasterCard's two-factor Chip Authentication Program (CAP)) is disposed on the same chip card. The device 100 is configured for dual-mode operation (i.e., contact and contactless modes), which includes an account holder verification method based on verification of a PIN entry made via pushbutton keyboard 120. Alternatively or additionally, the device may be configured with a biometric entry for suitable biometric verification of user identity. The device may also include a feedback mechanism, which is configured to inform a user whether a verification entry (PIN or biometric) is or is not accepted by the device. An alphanumeric display 130 may provide the information visually.

Device 100 enables merchants to accept contact card transactions and contactless smartcard transactions (e.g., PayPass transactions) and can be readily integrated with existing POS, ECR or PC devices via conventional wireless or wired links (e.g., a USB link).

Advantageously, device 100 can provide a transaction that has been "pre-signed." In a preferred embodiment of the device, this pre-signing is obtained combining the fast and easy Tap & Go payment feature of a Point of Sale PayPass application and a user authentication application that is traditionally used in non-face-to-face transaction environments (e-commerce environments). In the preferred embodiment, the latter authentication application includes robust PIN entry features and within the chip PIN validation service (e.g., CAP).

For PayPass POS transactions, device 100 can provide account holder authentication within the device itself. This capability advantageously eliminates the need to have the account holder enter his or her PayPass payment account PIN in a separate merchant POS Pin Pad.

FIG. 2 shows an exemplary method 200 of using device 100 for a PayPass payment to a merchant. In method 200, at step 210 the account holder enters his or her payment account PIN code digits utilizing the PIN entry capabilities of device 100 (e.g., via pushbutton keyboard 120), before the account holder interacts with the merchant's PayPass Point of Sale (POS) device or other PayPass accepting device (step 290). At subsequent or concurrent step 220, the account holder sees (or receives other feedback) that the PIN digits entries are being received by device 100. For example, display 130 may indicate the PIN digits as they are being entered by the account holder by visual and/or audio signal. In a preferred embodiment, an asterisk is displayed for each digit of the PIN entered.

At step 230, the entered PIN code is sent to the chip in device 100 via conventional chip contact plates or leads for validation within the chip. At step 240, PayPass application functionality is enabled only if the validation at step 230 indicates that the PIN is correct. Thus, steps 230 and 240 jointly provide at the same time a secure on/off feature for proximity payment as well as the user authentication feature of a PayPass user.

For a preferred embodiment of process 200, the PayPass application is configured to send, at step 250, a "verification status" indicator in a standard PayPass message protocol field to the PayPass accepting device (e.g., merchant POS device). The verification status indicator informs the accepting device that device 100/PayPass chip 110 has already verified the user and has produced Cardholder Verification Results (CVR) (e.g., PIN-Flag).

The verification status indicator may, for example, have a tag, length, and value format (TLV format), similar to EMV. In a particular example, the tag element uses EMV conventions and accordingly uses the 4 characters '9F34' to indicate to the terminal that the chip has produced Cardholder Verification Results (CVR). This Cardholder Verification Results "PIN-Flag" value may be placed in any suitable or available field portion of the PayPass or EMV "ARQC" cryptogram, which portion is then converted to display digit format according to, for example, PayPass binary display data conversion methods. It will be understood that there is no security need to encrypt this value since it is not the user's PIN, but is only an indication that the PayPass chip card 110 itself has just verified the PIN. Unlike a compromised PIN, the indicator value itself cannot be used to establish user identity.

With renewed reference to FIG. 2, in process 200 at step 260, the merchant's PayPass accepting device responds to the receipt of this special PIN-Flag field. The response may, for example, be any one of one of two responses A and B according to whether the tag value is an unsigned value or a digitally signed value, respectively.

Response A (Unsigned Value)

In a preferred embodiment, if the tag value is '9F34' (which it is not a PKI based digitally signed value), the merchant's POS device learns by receiving this "tag" value that the PayPass transaction has a "user entered and a local device (i.e., device 10) verified" PIN for the transaction. At step 262a, the merchants' POS device sends the "flag value" to the issuer for validation. In this option, the payment device issuer can verify if the PIN-Flag value field is correct. For this purpose at step 262a, the POS terminal sends a normal online authorization message with this PIN-Flag value populated in any convenient banking network message field, for example, by using Data Element (DE) #55 (chip data) or MasterCard's field DE #48 (UCAF data), or ISO DE 52 (PIN Data) field, or any other data field as appropriate for the network.

Response B (Digitally Signed Value)

If the tag value is a PKI based digitally signed flag value, for example, '9F35', the merchant's POS device learns by receiving this tag value that the PayPass transaction has a user-entered PIN value associated with the transaction and which PIN value has been verified by local device 100. Unlike the case of the unsigned values (step 262a), the signed flag value is not sent to the issuer for validation. Instead, at step 262b, the flag value is checked or verified locally within the POS device environment. For this purpose, the POS device receives the "PKI private key" signed PIN-Flag field. In a preferred embodiment, the PayPass chip card sends to the merchants' PayPass POS reader its EMV chip card Issuer public key EMV certificate (step 261). The merchants' PayPass POS device verifies the chip card's Issuer public key certificate using its EMV root certificate for the account payment brand. If good, the POS device then uses the just checked chip card's Issuer public key certificate over the signed PIN-Flag field to verify the PIN-Flag value using normal PKI signature verification techniques.

In this manner at step 262b, the merchants' PayPass POS device locally checks or verifies offline that the PIN-Flag value is valid. If the value is valid, subsequent processing of the payment transaction can proceed as for an offline signed transaction. The merchants' PayPass POS device also learns that it does not need to authenticate the user by prompting the user for a PIN code or signature or biometric entry.

With renewed reference to FIG. 1, it is noted that exemplary device 100 as shown is obtained by modifying a particular Xiring device (e.g., a Xiring Smart Token 1000). The Xiring devices have a battery, a display, and a general numeric entry capability for PIN entry and/or entry of additional transaction specific data. These devices also have one or more buttons (e.g., an enter key or navigation buttons), which power the device unit on or off and control the device's operation. The commercially available Xiring 1000 device is a self-contained product that features a Chip Authentication Program-compliant chip. A user enters his or her PIN into the device, which then creates a unique, one-time code. That code permits the user to conduct online banking or e-commerce transactions at suitably-enabled merchant sites. The one-time code that is generated, based on EMV and CAP, only works once, then becomes null upon the completion of the transaction.

To fabricate all-in-one device 100, a commercial Xiring 1000 device is modified by adding a PayPass antenna (not shown) and replacing the existing "contact only" chip in the commercial Xiring 1000 device with a dual-mode (contact and contactless) chip which supports PayPass functionality.

In addition to these hardware changes, optional CVM function software changes may be made to the PayPass payment application for CVM validation. The resulting device 100 is a small "CAP capable" self-powered non-card form factor device. The modified device is a combination unit with an "all-in-one" CAP device with additional PayPass functionality, which has cardholder authentication and PayPass payment ability.

All-in-one device 100 and its implementations may be backwards compatible with existing electronic payment infrastructure. Merchant terminals and PayPass readers, which are configured to process the cryptogram (i.e., a flag), will process the flag placed in the designated proximity protocol message field. Conversely, legacy terminals will ignore the designated proximity protocol message field and its contents (i.e., the flag) and otherwise process the transaction data in the usual manner.

In a preferred embodiment of this option, the cryptogram is coded in tag, length, value (TLV) format, similar to EMV. This tag (hex '9F34') indicates to the merchant terminal that the chip has produced a Cardholder Verification Result (CVR). The chip CVR cryptogram is unique for the upcoming transaction. The CVR result can be produced using other input data different from the input data used to create the PayPass cryptogram, but preferably is logically linked to the upcoming payment transaction cryptogram by using the same chip transaction counter. As another option, the CVR cryptogram may be a non-overlapping portion of a larger cryptogram used to create the PayPass cryptogram for the payment transaction.

This chip created cryptogram provides proof that the chip has completed account holder verification and the cryptogram (i.e., a flag) is passed to the PayPass reader in a convenient proximity protocol message field. This account holder verification value is subsequently sent to the card issuer in an existing 0100 authorization message field such as DE 55 (data element 55), or the MasterCard UCAF field, or the ISO DE 52 (PIN Data) field. There is no need to encrypt this CVR cryptogram indicator value since it is not the user's PIN but a verifiable (by the issuer) value which indicates that the PayPass chip has already locally verified the PIN or user provided biometric in the user device, not in any merchant point of sale equipment. Upon receiving the normal authorization message with this CVR cryptogram, it is an issuer option to verify if the value is correct.

In an alternate embodiment, dual-mode operation of the all-in-one device may exploit EMV PKI for card and PIN-Flag authentication. In this embodiment, the all-in-one device, which is associated with an EMV public key, signs the cryptogram (i.e., flag) using its private key. The EMV PayPass reader or terminal, using EMV PKI certificates and procedures, would verify or validate the signature of the particular PIN-Flag. After the validity of the signature has been validated, the device may go offline, and further transaction data processing may proceed in the usual EMV off-line manner on the basis that authorization was given by the user's smart card.

Although the present invention has been described in connection with specific exemplary embodiments, it should be understood that various changes, substitutions, and alterations apparent to those skilled in the art can be made to the disclosed embodiments without departing from the spirit and scope of the invention.

We claim:

1. A method for conducting a proximity payment transaction between a cardholder and a merchant, the method comprising:
    before interacting with a merchant Point of Sale (POS) device, pre-signing the proximity payment transaction using a proximity payment device based on input from the cardholder, wherein the pre-signing comprises:
        receiving cardholder identification information from the cardholder;
        verifying the cardholder identification information by the proximity payment device; and
        in response to said verifying, generating a digitally signed verification status indicator by the proximity payment device;
    sending, by the proximity payment device, the digitally signed verification status indicator to the Merchant POS device, wherein the digitally signed verification status indicator indicates to the Merchant POS device that the cardholder information has been verified by the proximity payment device,
    wherein the digitally signed verification status indicator permits local verification for an offline signed transaction;
    verifying locally, by the merchant POS device, the digitally signed verification status indicator before the offline signed transaction occurs;
    completing the offline signed transaction utilizing the digitally signed verification status indicator.

2. The method of claim 1, wherein sending, by the proximity payment device, the digitally signed verification status indicator to the Merchant POS device comprises sending the digitally signed verification status indicator value in a standard proximity payment message protocol field.

3. The method of claim 1, further comprising displaying the verification status indicator on a display of the proximity payment device.

4. The method of claim 1, wherein the verification status indicator has a tag, length, and value format.

5. The method of claim 1, wherein the digitally signed verification status indicator comprises '9F35'.

6. The method of claim 1, wherein sending the digitally signed verification status indicator to the merchant POS comprises placing the digitally signed verification status indicator in a cryptogram, and sending the cryptogram to the merchant POS.

7. The method of claim 1, wherein the digitally signed verification status indicator value comprises a Public Key Infrastructure (PKI) based digitally signed flag value.

* * * * *